(12) United States Patent
Ono (10) Patent No.: US 7,380,076 B2
(45) Date of Patent: May 27, 2008

(54) INFORMATION PROCESSING APPARATUS AND METHOD OF ACCESSING MEMORY

(75) Inventor: Yoshiyuki Ono, Hino (JP)

(73) Assignee: Seiko Epson Corporation, Tokyo (JP)

( * ) Notice: Subject to any disclaimer, the term of this patent is extended or adjusted under 35 U.S.C. 154(b) by 190 days.

(21) Appl. No.: 11/037,210

(22) Filed: Jan. 19, 2005

(65) Prior Publication Data

US 2005/0166007 A1    Jul. 28, 2005

(30) Foreign Application Priority Data

Jan. 27, 2004    (JP) ............... 2004-018400

(51) Int. Cl.
*G11C 7/22* (2006.01)
*G06F 12/00* (2006.01)
(52) U.S. Cl. ............ 711/155; 365/189.04; 711/104; 711/168
(58) Field of Classification Search ............ 711/5, 711/155, 128
See application file for complete search history.

(56) References Cited

U.S. PATENT DOCUMENTS

| | | | |
|---|---|---|---|
| 5,022,004 A | | 6/1991 | Kurtze et al. |
| 5,636,173 A | * | 6/1997 | Schaefer ............. 365/230.03 |
| 5,889,714 A | * | 3/1999 | Schumann et al. ......... 365/203 |
| 6,128,716 A | | 10/2000 | Biggs |
| 6,181,619 B1 | * | 1/2001 | Bogin et al. ............. 365/203 |
| 6,233,661 B1 | * | 5/2001 | Jones et al. ............. 711/154 |
| 6,470,433 B1 | | 10/2002 | Prouty et al. |
| 6,697,882 B1 | * | 2/2004 | Matsui ...................... 710/6 |
| 6,948,046 B2 | | 9/2005 | Higuchi |

FOREIGN PATENT DOCUMENTS

| | | |
|---|---|---|
| EP | A 0 375 121 | 6/1990 |
| EP | A 0 932 102 | 7/1999 |
| JP | A 5-266177 | 10/1993 |
| JP | A 8-123402 | 5/1996 |
| JP | A 8-123716 | 5/1996 |
| JP | A 10-091145 | 4/1998 |
| JP | 2001-142840 A | 5/2001 |
| JP | A 2003-256271 | 9/2003 |
| JP | 2004-013618 A | 1/2004 |
| WO | WO A 01/75623 | 10/2001 |

\* cited by examiner

*Primary Examiner*—Gary J Portka
(74) *Attorney, Agent, or Firm*—Oliff & Berridge PLC (57) ABSTRACT

The present invention makes it possible to inexpensively and quickly execute a process of rewriting data stored in a memory, thus reducing the power consumption of an information processing apparatus. In connection with a conventional Read-Modify-Write function, an information processing apparatus 1 first issues a write instruction, and after all the write commands in the write instruction have been issued, issues read commands from the read instruction. That is, the read commands are issued immediately after the write commands without issuing a precharge command from the write instruction or an active command from the read instruction. This serves to avoid executing the precharge and active commands between instructions which commands are unwanted for accesses to the same row address. The adverse effect of a CAS latency can also be avoided. Therefore, it is possible to inexpensively and quickly execute the process of rewriting data stored in the memory.

3 Claims, 6 Drawing Sheets

PRIOR ART

FIG. 6

PRIOR ART

FIG. 7

PRIOR ART

INFORMATION PROCESSING APPARATUS AND METHOD OF ACCESSING MEMORY

BACKGROUND OF THE INVENTION

1. Field of the Invention

The present invention relates to an information processing apparatus that reads and rewrites information stored in a memory as well as a method of accessing the memory.

2. Description of the Related Art

General-purpose memories such as SDRAM (Synchronous Dynamic Random Access Memories) have hitherto been used for information processing such as image processing.

With these memories, a specified bit width is set as a management unit. For example, for a memory with connections made using a 32-bit data bus, predetermined 32 bits are generally read and written at a time.

Thus, when an attempt is made to write data of a size smaller than the management unit described above (for example, 4-bit data) to the memory, the data in the other part of the management unit (for example, the remaining 28-bit data) may have invalid values.

Thus, a technique called Read-Modify-Write is used in order to prevent such a situation. The Read-Modify-Write technique employs a method of reading the whole data for the management unit containing write data specified, rewriting only the rewrite data part, and then writing the rewritten data for the management unit back to the memory.

For a memory such as an SDRAM which has the concept of pages, a memory access speed is often improved using a method called a burst transfer which transfers all data corresponding to a plurality of addresses within the same page at a time. In this case, the management unit described above corresponds to the amount of data transferred during a single burst transfer. For example, for a memory with connections made using a 32-bit data bus, if 4-word data is transferred during a single burst transfer, the management unit is 128 bits (32 bits×4 words).

Figure 6:
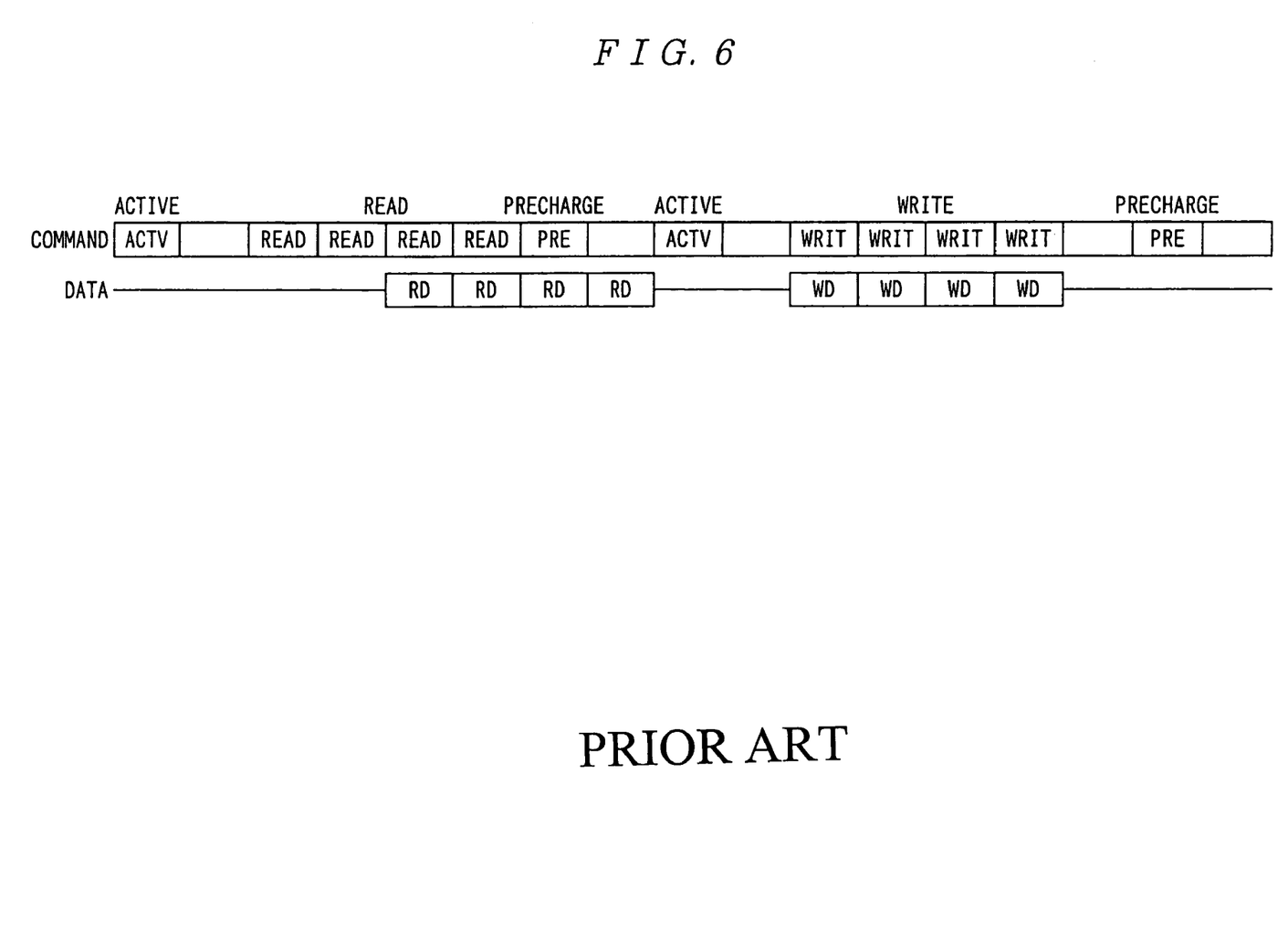
FIG. 6 is a timing chart showing the case in which the Read-Modify-Write technique is executed using a conventional information processing apparatus.
Figure 7:
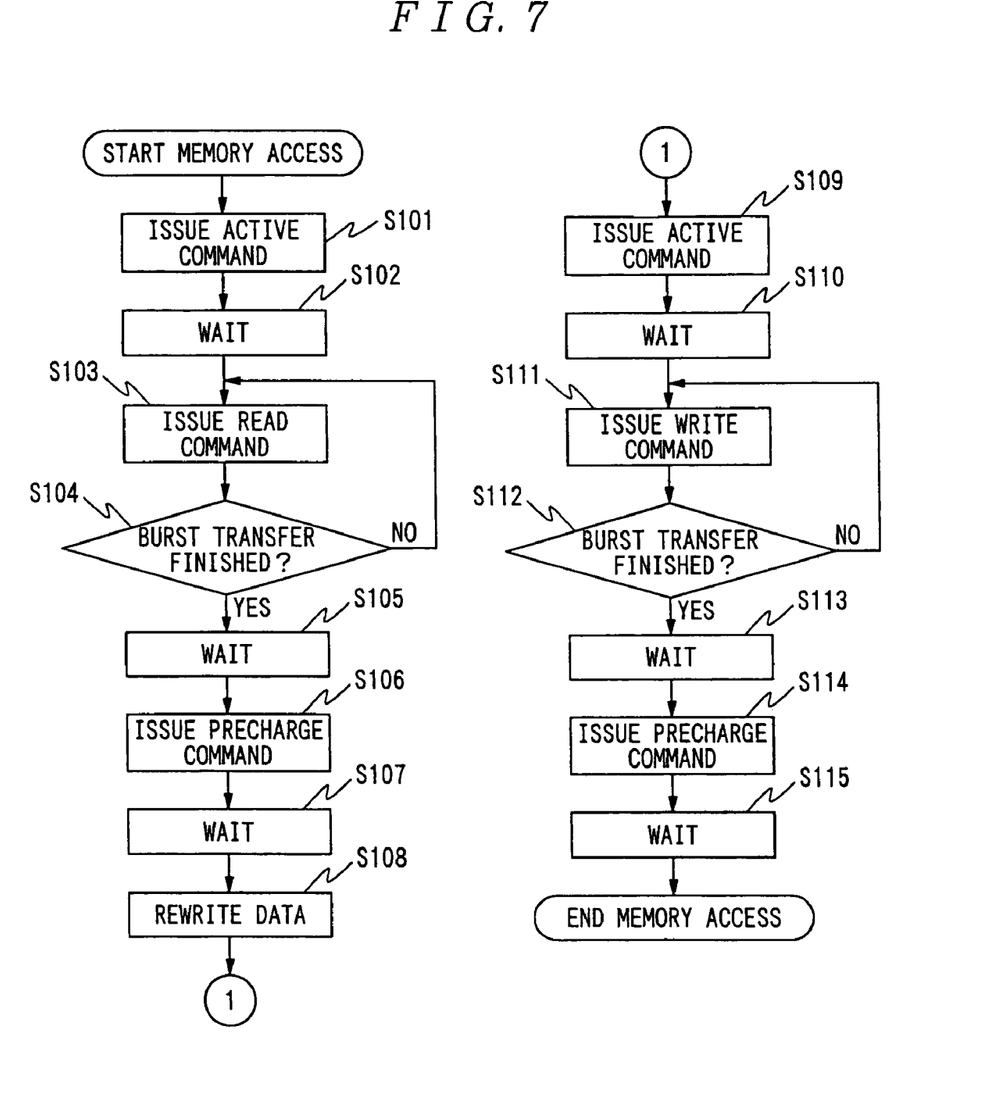
FIG. 7 is a flowchart of the timing chart shown in FIG. 6.

FIG. 6 is a timing chart showing the case in which the read, modify, and the write technique is executed in a conventional information processing apparatus. FIG. 7 is a flow chart of the timing chart shown in FIG. 6.

In FIG. 7, when the Read-Modify-Write is specified, the information processing apparatus issues an active command (step S101). The information processing apparatus waits for one cycle (executes NOP) (step 102).

In this case, the information processing apparatus waits for one cycle. However, the information processing apparatus may wait for two or more cycles or zero cycle (no wait) depending on the specifications of the SDRAM used. This also applies to all the wait steps.

Subsequently, the information processing apparatus issues a read command (which reads data directly from the memory) (step S103). The information processing apparatus then determines whether a burst transfer of read data from the memory has been finished (step S104). If the information processing apparatus determines that the burst transfer has not been finished, it shifts to the processing in the step S103. On the other hand, if the information processing apparatus determines that the burst transfer has been finished, it waits for a number of cycles required in step S105. Then, in step S106, the information processing apparatus issues a pre-charge command. However, since the timing chart in FIG. 6 indicates that the SDRAM used is of a type that does not require the wait in step S105, FIG. 6 does not show the wait in step S105.

Then, the information processing apparatus waits for one cycle (step S107). The information processing apparatus then rewrites the data read from the memory (step S108).

The processing in step S108 is executed in parallel and thus does not appear in the timing chart in FIG. 6.

Subsequently, the information processing apparatus issues an active command for a succeeding write (step S109). The information processing apparatus waits for one cycle (step s110).

Then, the information processing apparatus issues a write command (which actually inputs and writes data to the memory) (step S111). The information processing apparatus then determines whether or not a burst transfer of write data to the memory has been finished (step S112).

In step S112, if the information processing apparatus determines that the burst transfer of the write data to the memory has not been finished, it shifts to the processing in step S111. If the information processing apparatus determines that the burst transfer of the write data to the memory has been finished, it waits for one cycle (step S113).

Then, the information processing apparatus issues a pre-charge command (step S114) and then waits for one cycle (step S115). The information processing apparatus then finishes executing the Read-Modify-Write.

However, if Read-Modify-Write such as that shown in FIG. 6 is executed, a process must be executed in order to protect data that is not rewritten; data for the management unit is read from the memory and then changed, and the data changed is written back to the memory. This increases the time required for processing.

Thus, various methods for improving the Read-Modify-Write technique have been proposed.

For example, the technique described in JP5-266177A omits a write command if rewriting is not required. Further, the technique described in JP2003-256271A masks parts that are desired not to be rewritten.

In addition, the technique described in JP8-123402A or JP8-123716A are known.

However, the prior art, including the techniques described in the above publications, increases the speed of a process of rewriting the memory under special conditions. Thus, the prior art is not applicable to general purposes.

Further, the prior art requires a memory having a special structure, thus increasing costs.

In other words, it is difficult to inexpensively and quickly execute a process of rewriting data stored in the memory. As a result, a long time is required to rewrite data. This is one of the causes of an increase in the power consumption of the information processing apparatus.

It is an object of the present invention to enable the inexpensive and quick execution of a process of rewriting data stored in the memory, to reduce the power consumption of the information processing apparatus.

SUMMARY OF THE INVENTION

To accomplish the above object, the present invention provides an information processing apparatus that can access an address in a memory which address is specified by a row address set using an active command and a column address set by a read command or a write command, the apparatus being characterized in that if at least either read commands or write commands are successively issued for data at the same row address (for example, if read commands are consecutively issued, write commands are successively issued, or each read command is followed by a write command), a succeeding read command or write command is issued without issuing a precharge command and an active command after a preceding read command or write command.

With this configuration, when commands are successively issued for the same row address, it is possible to avoid to uselessly execute a precharge command corresponding to a preceding command and an active command corresponding to a succeeding command. The speed of processing can be inexpensively increased.

The information processing apparatus is also characterized in that if a data write or read is executed on data at the same row address, a read command is issued during a cycle immediately after a write command has been completely issued.

This configuration serves to avoid the adverse effect of CAS latency that may be caused by the preceding read command. Consequently, the speed of processing can be inexpensively increased.

The information processing apparatus is also characterized in that if a process is repeatedly executed on the same row address to read data for a management unit (for example, for a 32-bit memory, data of 32 bits, which correspond to the management unit) from the memory which data contains data to be rewritten, then to rewrite the data for the management unit, and then to write the rewritten data back to the memory, then a leading read command reads the data and the data is rewritten, and subsequently during a cycle immediately after a write command has been issued to write a result of rewriting of the data read by the preceding read command, a read command is issued to subsequently read data for the management unit containing data to be rewritten.

The information processing apparatus is also characterized by including address delay section (for example, an address buffer 30 in FIG. 3) for outputting an input memory address of a rewrite target after a delay of predetermined cycles, address selecting section (for example, an address selector 40 in FIG. 3) for selectively outputting the memory address delayed by the address delay section or an input current memory address, rewrite target data holding section (for example, a data buffer 70 in FIG. 3) for reading and holding data in the memory which is to be rewritten, data calculating section (for example, a data calculating unit 60 in FIG. 3) for rewriting the data to be rewritten which data is held in the rewrite target data holding section, and control section (for example, a control unit 10 in FIG. 3) for causing the data calculating section to output the data rewritten by the data calculating section to the memory, while simultaneously causing the address selecting section to select the memory address delayed by the address delay section, and causing the rewrite target data holding section to read data from the memory, while simultaneously causing the address selecting section to select the input current memory address.

This configuration makes it possible to inexpensively increase the speed at which the conventional Read-Modify-Write technique is executed, without using an expensive exclusive memory.

The present invention also provides a method of accessing a memory, the method accessing an address in a memory which address is specified by a row address set using an active command and a column address set by a read command or a write command, wherein if at least either read commands or write commands are successively issued for data at the same row address, a succeeding read command or write command is issued without issuing a precharge command or an active command after a preceding read command or write command.

Thus, the present invention makes it possible to inexpensively and quickly execute a process of rewriting data stored in the memory.

DETAILED DESCRIPTION OF THE PREFERRED EMBODIMENTS

An embodiment of the present invention will be described with reference to the drawings.

According to the present invention, improvements are made for the case in which a read instruction and a write instruction are successively executed on the same row address as in the case of the conventional Read-Modify-Write. This increases the speed of processing.

Therefore, first, a fundamental idea regarding a method of accessing a memory according to the present invention will be described taking the case of the Read-Modify-Write as an example.

For the Read-Modify-Write, a read instruction and a write instruction successively access the same row address. This eliminates the need for a precharge command and an active command executed after a data read.

Thus, it is possible to omit the precharge command and active command after the data read in the timing chart shown in FIG. 6 and to successively execute a read instruction and a write instruction.

Figure 1:
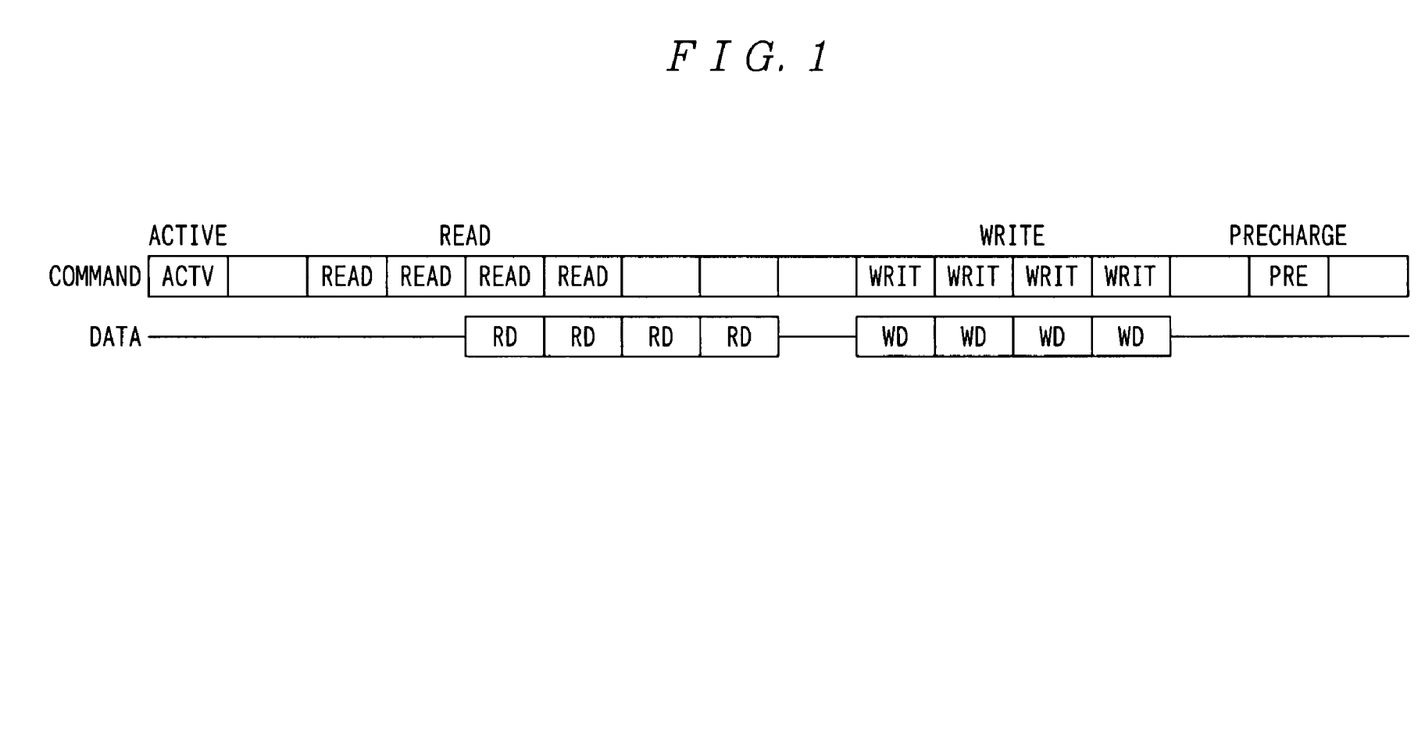
FIG. 1 is a timing chart showing the case in which a precharge command and an active command are omitted.

FIG. 1 is a timing chart showing the case in which a write instruction is followed by a write command.

In this case, data (RD) read by a read command from a memory and data (WD) to be written by a write command to the memory may collide against each other on a data bus because of a slight deviation of timings.

Thus, to avoid collisions, measures are often taken for creating an interval of about one cycle between the read data (RD) and the write data (WD) as shown in FIG. 1.

Further, owing to the specifications of the memory, there is a time lag called a CAS latency after the read command has been executed and before the read data (RD) appears on the data bus.

For the above reason, an appropriate number of NOP commands (which executes nothing) are inserted between the read commands and the write commands as shown in FIG. 1. This does not depart from the spirit of the present invention.

Further, this flow chart corresponds to FIG. 7 from which steps S106, S107, S109, and S110 are omitted.

By thus omitting the precharge command and active command executed after a data read, it is possible to reduce the number of cycles required from 17 to 16 to increase the speed of processing, compared to the conventional Read-Modify-Write technique, which simply executes a write command after a read command has been finished.

Further, if a read instruction and then a write instruction access the memory as shown in FIG. 1, a latency of 2 cycles required to read data occurs in the read instruction. Accordingly, NOP instructions are inserted to adjust timings. Thus, the write instruction cannot be executed immediately after the read instruction.

By thus replacing the read instruction with the write instruction in the timing chart shown in FIG. 6, it is possible that the read instruction can be executed immediately after the preceding write instruction. Even in this case, the instructions are successively executed on the same row address. Consequently, the precharge command and the active command can be omitted as in the case shown in FIG. 4.

According to the present invention, a technique for executing a read instruction after a preceding write instruction is called a write, modify, and read technique.

Figure 2:
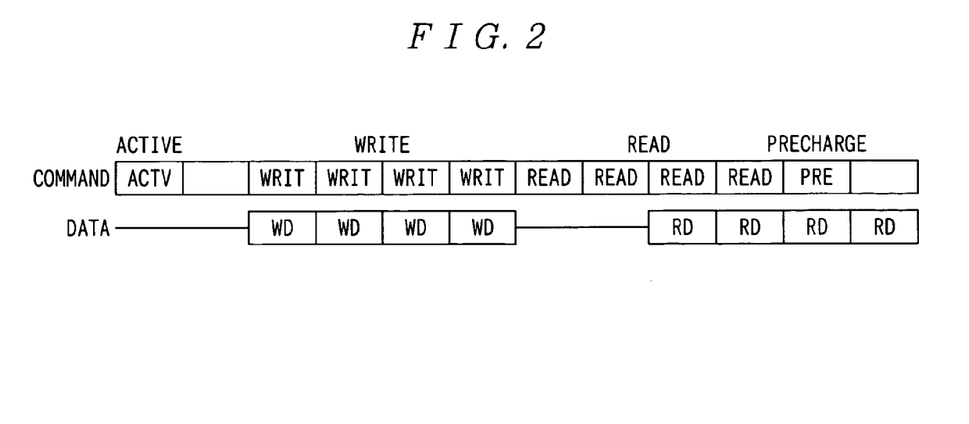
FIG. 2 is a timing chart showing the case in which a write instruction precedes a read instruction.

A timing chart showing this technique is as shown in FIG. 2.

A flowchart showing this technique will be described later (see FIG. 4).

By thus allowing a write instruction and a read instruction to access the memory in this order, it is possible to reduce the number of cycles required from 17 to 12 to further increase the speed of processing, compared to the case in which the write instruction and then the read instruction access the memory.

Now, description will be given of an information processing apparatus 1 to which the present invention is applied.

Figure 3:
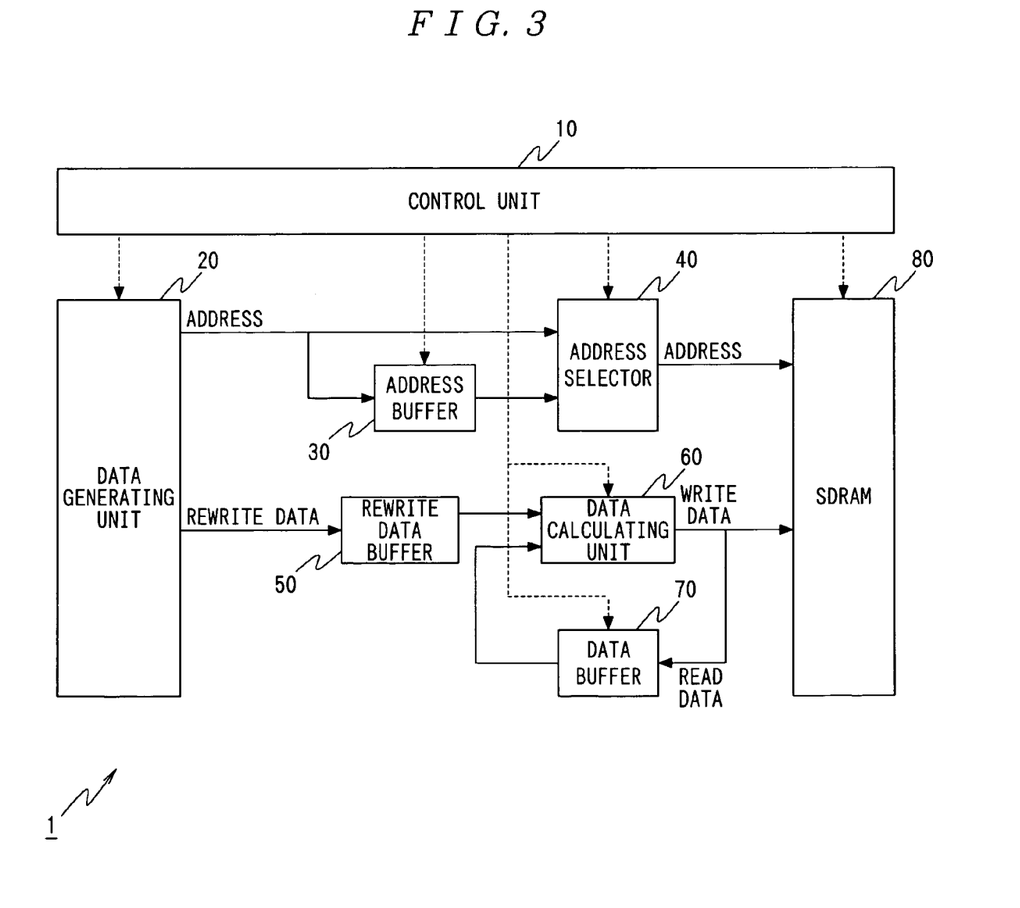
FIG. 3 is a block diagram showing the functional configuration of an information processing apparatus 1 to which the present invention is applied.

FIG. 3 is a block diagram showing the functional configuration of the information processing apparatus 1 to which the present invention is applied.

In FIG. 3, the information processing apparatus 1 includes a control unit 10, a data generating unit 20, an address buffer 30, an address selector 40, a rewrite data buffer 50, a data calculating unit 60, a data buffer 70, and an SDRAM 80.

The control unit 10 controls the whole information processing apparatus 1. The control unit 10 thus manages timings for data inputs to and data outputs from the data generating unit 20, address buffer 30, address selector 40, rewrite data buffer 50, data calculating unit 60, the data buffer 70, and the SDRAM 80 as well as operations of each unit.

In response to an indication from the control unit 10, the data generating unit 20 outputs a write address in the SDRAM 80 to the address buffer 30 and address selector 40. The data generating unit 20 further generates new data for are write (rewrite data) and outputs the rewrite data generated to the rewrite data buffer 50.

The address buffer 30 temporarily holds the address output by the data generating unit 20. Then, in response to an indication from the control unit 10, the address buffer 30 outputs the address held to the address selector 40.

In response to an indication from the control unit 10, the address selector 40 selects the address input by the data generating unit 20 (when a write command is executed) or the address input by the address buffer 30 (when a read command is executed). The address selector 40 then outputs the address selected to the SDRAM 80.

The rewrite data buffer 50 temporarily holds the rewrite data input by the data generating unit 20. Then, in response to an indication from the control unit 10, the rewrite data buffer 50 uses a predetermined timing to output the rewrite data held to the data calculating unit 60.

The data calculating unit 60 changes the data input by the data buffer 70 using the rewrite data input by the rewrite data buffer 50. Specifically, the data input by the data buffer 70 is partly replaced with the replace data, or a logical calculation such as a logical OR, a logical AND, or an exclusive OR is executed on a part of the data input by the data buffer 70. Then, in response to an indication from the control unit 10, the data calculating unit 60 outputs the data changed to the SDRAM 80.

The data buffer 70 temporarily holds predetermined data (for example, data of 32 bits corresponding to the management unit of the SDRAM 80) containing rewrite target data read from the SDRAM 80 in response to the indication from the control unit 10. Then, in response to an indication from the control unit 10, the data buffer 70 uses a predetermined timing to output the data held to the data calculating unit 60.

The SDRAM 80 comprises a 32-bit data bus to function as a work memory for the information processing apparatus 1. Thus, to rewrite data, the SDRAM 80 updates data of 32 bits corresponding to the management unit at a time, the data containing data to be rewritten.

The SDRAM has been described as an example of a general-purpose memory. However, the general-purpose memory is not limited to this. A memory based on another system may be used provided that it can be used as a memory. In that case, since the names of command signals or instruction signals vary depending on the types of memories, the names such as the active command, the read command, the write command, and the precharge command described above should be changed to those indicating equivalent operations.

Now, description will be given of operations performed if the information processing apparatus 1 executes the write, modify, and read technique.

Figure 4:
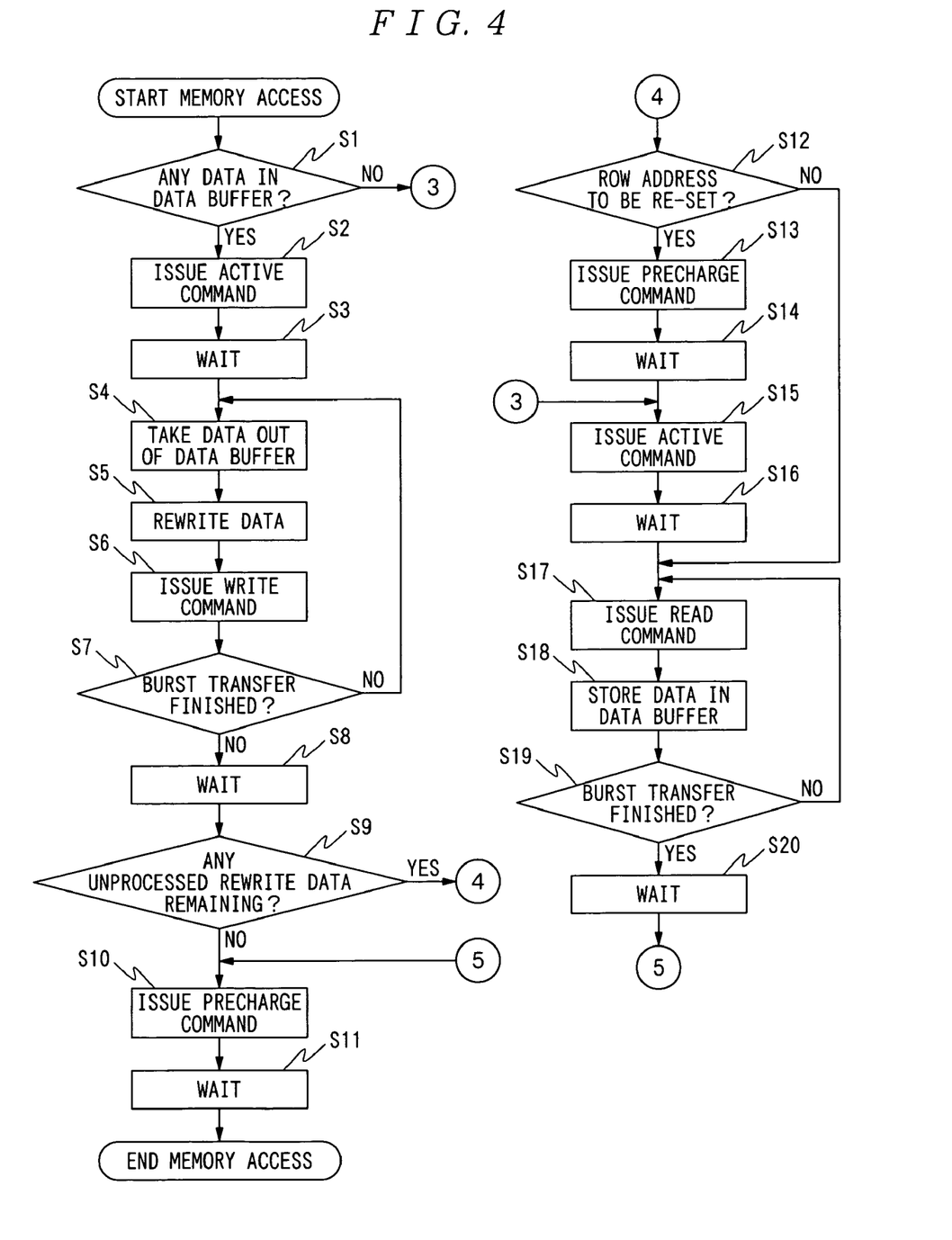
FIG. 4 is a flow chart showing a process based on the write, modify, and read technique.

FIG. 4 is a flowchart showing a process based on the write, modify, and read technique. The flowchart shown in FIG. 4 shows an example of a process that realizes the timing chart shown in FIG. 2.

In FIG. 4, when an indication for the write, modify, and read is given, the information processing apparatus 1 determines whether or not the data buffer 70 holds data (step S1). If the information processing apparatus 1 determines that the data buffer 70 does not hold any data, it shifts to the processing in step S15. On the other hand, if the information processing apparatus 1 determines that the data buffer 70 holds data, it issues an active command (step S2). The information processing apparatus 1 waits for one cycle (executes NOP) (step S3).

In this case, the information processing apparatus 1 waits for one cycle. However, the information processing apparatus 1 may wait for two or more cycles or zero cycle (no wait) depending on the specifications of the SDRAM used. This also applies to all the wait steps.

Then, the information processing apparatus 1 allows the data buffer 70 to output the data to the data calculating unit 60 (step S4). The information processing apparatus 1 then rewrites the data with rewrite data generated by the data generating unit 20 (step S5). The information processing apparatus 1 further issues a write command (which actually input and writes the data to the SDRAM 80) (step S6).

Steps S4 to S6 are executed in parallel.

Subsequently, the information processing apparatus 1 determines whether or not a transfer of the write data to the SDRAM 80 has been finished (step S7). If the information processing apparatus 1 determines that the burst transfer has not been finished, it shifts to the processing in step S4. If the information processing apparatus determines that the burst transfer has been finished, it waits for one cycle (step S8).

Then, the information processing apparatus 1 determines whether or not any of the rewrite data generated by the data generating unit 20 has been unprocessed (step S9). If the information processing apparatus 1 determines that the all the rewrite data has been processed, then it issues a precharge command (step S10). The information processing apparatus 1 waits for one cycle (step S11) to finish the write, modify, and read process.

In step S9, if the information processing apparatus 1 determines that any of the rewrite data has been unprocessed, it then determines whether or not a row address must be re-set (step S12). If the information processing apparatus 1 determines that a row address must be re-set, it issues a precharge command (step S13). The information processing apparatus 1 waits for one cycle (step S14).

After step S14 has been executed, if the information processing apparatus 1 determines in step S1 that the data buffer 70 does not store any data, it issues an active command (step S15). The information processing apparatus 1 waits for one cycle (step S16).

Then, the information processing apparatus 1 issues a read command (which reads data directly from the SDRAM 80) (step S17). The information processing apparatus 1 causes the data read to be held in the data buffer 70 (step S18).

Steps S17 and S18 are executed in parallel.

Then, the information processing apparatus 1 determines whether or not a burst transfer of the data from the SDRAM 80 to the data buffer 70 has been finished (step S19). If the information processing apparatus 1 determines that the burst transfer has not been finished, it shifts to the processing in step S17. On the other hand, if the information processing apparatus 1 determines that the burst transfer has not been finished, it waits for a number of cycles required in step S20. The information processing apparatus 1 then shifts to the processing in step S10. In this case, if the SDRAM used does not require the wait in step S20, the information processing apparatus 1 does not actually wait.

As described above, in connection with the conventional Read-Modify-Write function, the information processing apparatus 1 according to the present invention first issues a write instruction, and after all the write commands in the write instruction have been issued, issues read commands from the read instruction. That is, the read commands are issued immediately after the write commands without issuing the precharge command from the write instruction or the active command from the read instruction.

This serves to avoid executing the precharge and active commands between instructions which commands are unwanted for accesses to the same row address. The adverse effect of a CAS latency can also be avoided.

Therefore, it is possible to inexpensively and quickly execute a process of rewriting data stored in the memory (in this case, the SDRAM 80).

Figure 5:
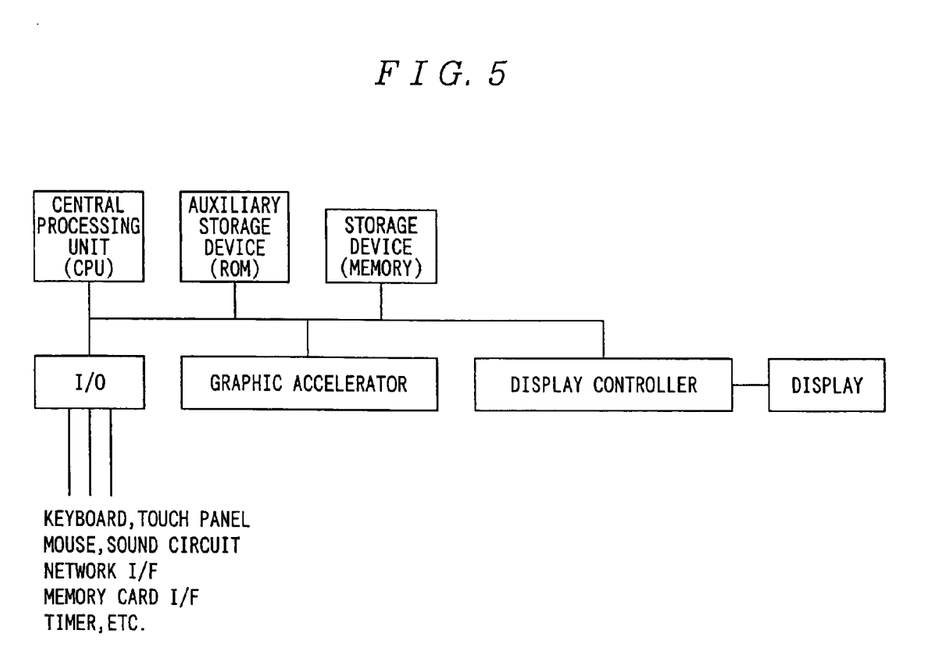
FIG. 5 is a diagram showing an example of the functional configuration of the information processing apparatus to which the present invention is applied.

Further, the present invention is particularly effective on memory accesses accompanying image drawing. For example, the information processing apparatus 1 is effectively incorporated into an apparatus that executes image processing as shown in FIG. 5. In this figure, a part consisting of a graphic accelerator and a storage device realizes the functions of the information processing apparatus 1 according to the present embodiment.

What is claimed is:

1. An information processing apparatus that can access an address in a memory which address is specified by a row address set using an active command and a column address set by a read command or a write command, wherein if at least either read commands or write commands are successively issued for data at the same row address, a succeeding read command or write command is issued without issuing a precharge command or an active command after a preceding read command or write command, and if a read instruction and then a write instruction are indicated on data at the same row address, a read command is issued during a cycle immediately after a write command has been completely issued, by replacing the read instruction with the write instruction, characterized in that the information processing apparatus comprises:

an address delay section for outputting an input memory address of a rewrite target after a delay of predetermined cycles;

an address selecting section for selectively outputting the memory address delayed by the address delay section or an input current memory address;

a rewrite target data holding section for reading and holding data in the memory which is to be rewritten;

a data calculating section for rewriting the data to be rewritten where the data is held in the rewrite target data holding section; and a control section for causing the data calculating section to output the data rewritten by the data calculating section to the memory, while simultaneously causing the address selecting section to select the memory address delayed by the address delay section, and causing the rewrite target data holding section to read data from the memory, while simultaneously causing the address selecting section to select the input current memory address.

2. The information processing apparatus according to claim 1, wherein if a process is repeatedly executed on the same row address to read data for a management unit from the memory which data contains data to be rewritten, then to rewrite the data for the management unit, and then to write the rewritten data back to the memory, then a leading read command reads the data and the data is rewritten, and subsequently during a cycle immediately after a write command has been issued to write a result of rewriting of the data read by the preceding read command, a read command is issued to subsequently read data for a management unit containing data to be rewritten.

3. A method of accessing a memory, the method accessing an address in a memory which address is specified by a row address set using an active command and a column address set by a read command or a write command, and wherein if at least either read commands or write commands are successively issued for data at the same row address, a succeeding read command or write command is issued without issuing a precharge command or an active command after a preceding read command or write command, and if a read instruction and then a write instruction are indicated on data at the same row address, a read command is issued during a cycle immediately after a write command has been completely issued, by replacing the read instruction with the write instruction,
characterized in that
said method comprises:
an address delay step for outputting an input memory address of a rewrite target after a delay of predetermined cycles;
an address selecting step for selectively outputting the memory address delayed by the address delay step or an input current memory address;
a rewrite target data holding step for reading and holding data in the memory which is to be rewritten;
a data calculating step for rewriting the data to be rewritten where the data is held in the rewrite target data holding section; and
a control step for causing the data calculating step to output the data rewritten by the data calculating step to the memory, while simultaneously causing the address selecting step to select the memory address delayed by the address delay step, and causing the rewrite target data holding step to read data from the memory, while simultaneously causing the address selecting step to select the input current memory address.

* * * * *